No. 832,901. PATENTED OCT. 9, 1906.
J. GROUVELLE & H. ARQUEMBOURG.
MEANS FOR REGULATING THE SPEED OF INTERNAL COMBUSTION ENGINES.
APPLICATION FILED SEPT. 19, 1903.

2 SHEETS—SHEET 1.

Witnesses.
Edouard Carénou
Charles Marais

Inventors.
Jules Grouvelle
Henri Arquembourg

UNITED STATES PATENT OFFICE.

JULES GROUVELLE AND HENRI ARQUEMBOURG, OF PARIS, FRANCE.

MEANS FOR REGULATING THE SPEED OF INTERNAL-COMBUSTION ENGINES.

No. 832,901. Specification of Letters Patent. Patented Oct. 9, 1906.

Application filed September 19, 1903. Serial No. 173,803.

*To all whom it may concern:*

Be it known that we, JULES GROUVELLE and HENRI ARQUEMBOURG, (trading as LA SOCIÉTÉ JULES GROUVELLE ET H. ARQUEMBOURG,) citizens of the French Republic, residing at 71 Rue du Moulin-Vert, Paris, France, have invented certain new and useful Improvements in Means for Regulating the Speed of Internal-Combustion Engines, of which the following is a specification.

This invention relates to means applicable to the regulation of the speed of internal-combustion engines; and the object of the invention is to provide regulating means whereby water under pressure is utilized as the medium for actuating the regulating devices. The variation in the pressure of water used for cooling the parts of the engine, due to varying speed of the engine, acts to control and vary proportionately the supply of volatile combustible liquid to the carbureter of the engine. Means in the nature of valves are supplied to control the flow of the water through the regulator.

Figure 1:
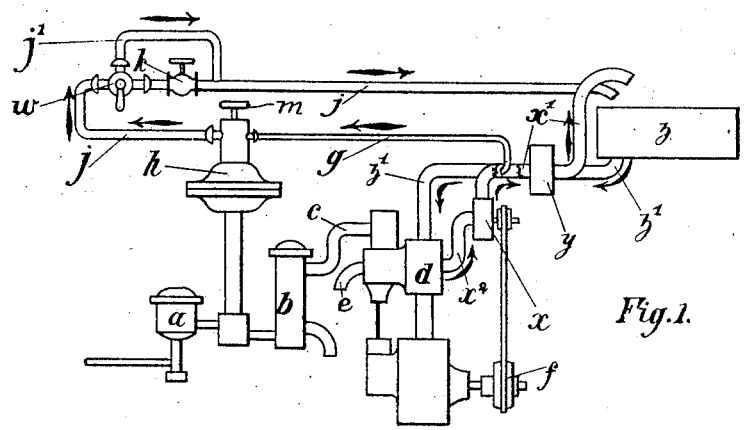
Figure 3:
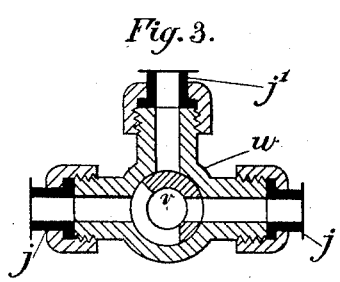
Figure 4:
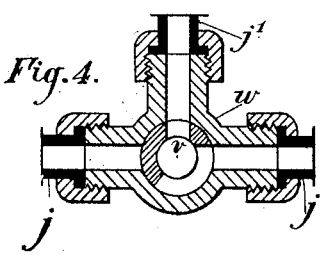
Figure 5:
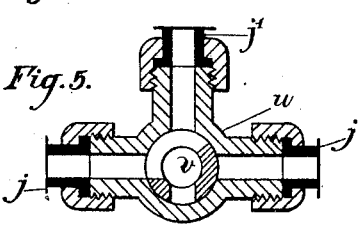
Figure 6:
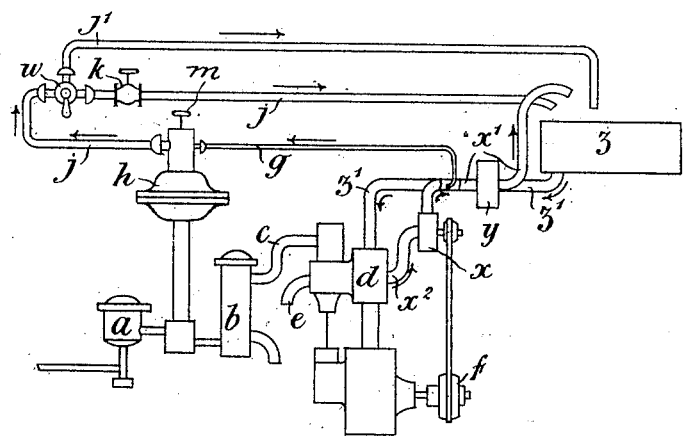
Figure 7:
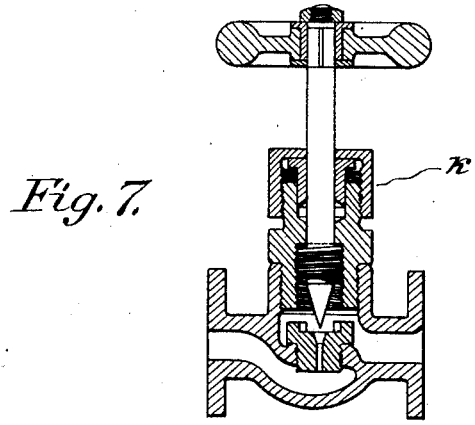

In the accompanying drawings, which illustrate an embodiment of the invention, Figure 1 is a somewhat diagrammatic general view of the engine and its appliances on a relatively small scale. The other views are details on a larger scale, Fig. 2 being a sectional elevation of the diaphragm-regulator and its accessories; and Figs. 3, 4, and 5 are sectional views of the multiple-way valve. Fig. 6 is a view similar to Fig. 1, but illustrating a slight modification. Fig. 7 is an enlarged sectional view of the cut-off cock $k$.

Referring to general view, Fig. 1, $a$ designates the vessel to contain the volatile combustible liquid, in which the liquid is maintained at a constant level by a float. $b$ is the vaporizer and mixer of the carbureter. $c$ is the pipe which conveys the carbureted air to the engine. $d$ designates the engine-cylinder and crank-chamber. $e$ is the exhaust-outlet for the products of combustion. $x$ is the pump which circulates the cooling-water through the jackets of the water. $f$ is the fly-wheel of the engine, from which the pump is driven through any suitable means. $y$ is the refrigerator or cooler for the water. $z$ is the water reservoir or tank. $x'$ is the pipe connecting the eduction side of the pump with the tank $z$. $x^2$ is the pipe connecting the cylinder-jacket with the induction side of the pump. $z'$ is the pipe which supplies water from the tank $z$ to the cylinder-jacket. $h$ designates in this figure the diaphragm-chamber of the regulator, to be hereinafter more particularly described. $g$ designates a relatively slender pipe which connects at one end with the upper part of the diaphragm-chamber and at the other end enters the pipe $x'$ and is curved at its extremity in the manner of a Pitot tube, with its open end directed toward the pump. $j$ is a tube or pipe of considerably larger diameter than the pipe $g$ and connecting at one end with the chamber $h$, the other end extending back to the tank $z$. $k$ is a cut-off cock or valve in the pipe $j$. This device will have, by preference, a conical spindle-valve with a screw-threaded stem. $w$ designates a multiple-way cock or valve in the pipe $j$ between the cock $k$ and the chamber $h$. This valve controls the flow through a by-pass $j'$ about the throttle or cut-off $k$. The water may flow through the by-pass to the pipe $j$ beyond or flow directly to the tank $z$.

Figure 2:
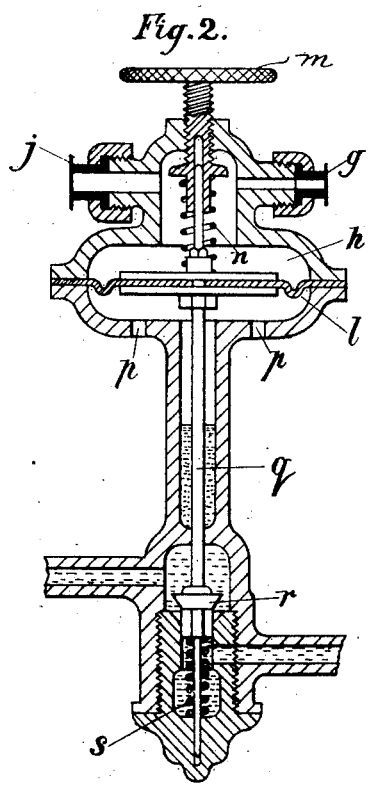

Referring to Fig. 2, in the broader part of the chamber $h$ is a flexible diaphragm $l$, and the tubes $g$ and $j$ connect with the chamber above said diaphragm. A valve-stem $q$, secured to the diaphragm, is provided below with a valve $r$, which controls the flow through the lower part of the chamber of the volatile liquid from the vessel $a$ to the vaporizer $b$ of the carbureter. The stem $q$ is prolonged above the diaphragm and is guided in a bore in a screw-plug $m$ in the top of the chamber. On this extension is a spring $n$, and on a similar extension of the stem below the valve $r$ is a spring $s$. The screw $m$ can be employed to regulate the tension of the springs $n$ and $s$. The upper spring $n$ acts to compensate the lower spring $s$, and the latter tends to open the valve $r$. There are apertures $p$ in the chamber $h$ below the diaphragm in order to connect that part of the chamber $h$ with the atmosphere.

Figs. 3, 4, and 5 show the multiple-way valve $w$ in its three positions. Fig. 3 shows the plug $v$ of the valve so set that the by-pass $j'$ is closed. Fig. 2 shows the plug so set that the flow from the chamber $h$ to the tank $z$ is closed, and Fig. 5 shows said plug so set that the by-pass is open and the direct way to the tank $z$ is closed.

As the water from the pipe $x'$ flows through the tube $g$ to the chamber $h$, above the diaphragm therein, it will be obvious that any pressure it may exert on the diaphragm will tend to close the valve $r$, and thus act to reduce the supply of volatile liquid to the engine, thereby diminishing the speed of the latter. Now if the valve $w$ be set as in Fig. 3, with the direct passage open for the flow in the direction of the arrows in Fig. 1, the operation will be as follows: The water forced by the pump $x$ through the tube $g$ to the diaphragm-chamber will exert a pressure on the diaphragm which is proportioned to the speed of the pump, and therefore of the engine, and also to the resistance which is due to the small diameter of the tube $g$ and the extent of opening of the cut-off valve $k$. If this valve $k$ be fully closed, the pressure on the diaphragm-chamber will be equal to that at the receiving end of the tube $g$, for the reason that the pipes $j$ and $j'$ being cut off the resistance arising from the small diameter of the tube $g$ cannot be considered, and, moreover, if the tension of the spring $s$ be so regulated that the differential tension of the two springs $n$ and $s$ is in equilibrium with the above-mentioned pressure the engine will work at a speed which must be considered the minimum speed desired, this minimum speed being, moreover, variable to suit each special case. If the cock $k$ be now opened more or less, the pressure in the chamber $h$ and on the diaphragm will diminish and the valve $r$ rise, thus increasing the supply of the volatile liquid, while, on the other hand, the water will circulate in the tubes $g$ and $j$ in such a way that the engine and pump will run at a greater speed, whereby the water, in spite of the opening for its flow by the valve $k$, will again accumulate pressure on the diaphragm in the chamber $h$ and permit the diaphragm to again adjust itself into equilibrium with the differential tension of the springs $n$ and $s$. This has the result of regulating the engine to a greater speed, which will increase proportionately to the extent of opening of the valve $k$. If at any time or for any reason it is desired to diminish the speed of the engine very rapidly, it will suffice, without touching the valve $k$, which still remains open to the extent proportioned to the speed previously desired, to turn the plug $v$ of the valve $w$ to the position seen in Fig. 4, thus cutting off the flow through the tube $j$ entirely. This will cause such an increase of pressure on the diaphragm that the valve $r$ will be moved at once toward its seat. On the contrary, if at any time it is desired to increase the speed of the engine rapidly it will suffice, without touching the valve $k$, to turn the plug of the valve $w$ to the position seen in Fig. 5, thus opening fully the by-pass $j'$ about the valve $k$. This will so reduce the pressure on the diaphragm that the valve $r$ will instantly rise.

Fig. 6 shows the by-pass $j'$ extending directly to the tank $z$ instead of being connected with the pipe $j$ beyond the valve $k$, as in Fig. 1.

Obviously the details of the construction shown may be varied without departing from the invention. For example, the tube $g$ is made relatively small as a simple and convenient means of restricting the flow of the water to the diaphragm-chamber from the pump, and any other means may be employed for effecting this end. Obviously, also, it is not important that the valve $r$, controlled by the diaphragm and springs, shall be disposed or constructed precisely as herein shown. Its function is to regulate the quantity of explosive gases or vapor supplied to the engine, and so long as it effects this object its particular arrangement and disposition is not essential to the present invention.

Having thus described our invention, we claim—

1. A device for the purpose specified, having mechanism for regulating the supply of combustible fluid to the engine, said mechanism including a diaphragm-chamber and diaphragm, means for forcing water into and through said diaphragm-chamber with a pressure proportioned to the speed of the engine, manually-operatable means for regulating the flow of the water from the diaphragm-chamber, and separate manually-operatable means for wholly opening and wholly shutting off said flow from the diaphragm-chamber.

2. An internal-combustion engine, having a water-tank, a circulating-pipe connecting said tank with the jacket of the engine, a circulating-pump for said water, driven by the engine at a speed proportioned to the speed of the engine, a vessel to contain a volatile combustible liquid, a carbureter, and pipes connecting said vessel with the carbureter and the carbureter with the engine, in combination with speed-regulating means, comprising a diaphragm-chamber, a diaphragm therein, a valve $r$ which controls the supply of volatile liquid to the carbureter, a stem $q$ connecting the diaphragm with said valve, a spring $n$ tending to close said valve, a spring $s$ tending to open said valve, a tube $g$ of restricted capacity which supplies water from the eduction side of the pump to the diaphragm-chamber, a pipe $j$ at the outlet of the said chamber, a throttle-valve $k$ in said pipe, a by-pass $j'$, and a multiple-way valve $w$, controlling the flow through the pipe $j$ and said by-pass.

In testimony whereof we have signed our names to this specification in the presence of two subscribing witnesses.

JULES GROUVELLE.
HENRI ARQUEMBOUR'

Witnesses:
 EDOUARD CARÉNON,
 CHARLES MARAIS.